(12) United States Patent
Lien (10) Patent No.: US 11,808,985 B2
(45) Date of Patent: Nov. 7, 2023

(54) WAVEGUIDE COMBINER WITH LIGHT BEAM PROCESSING AREA

(71) Applicant: HIMAX TECHNOLOGIES LIMITED, Tainan (TW)

(72) Inventor: Jiun-Yi Lien, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/498,759

(22) Filed: Oct. 12, 2021

(65) Prior Publication Data

US 2023/0114841 A1    Apr. 13, 2023

(51) Int. Cl.
*G02B 6/26* (2006.01)
*G02B 27/09* (2006.01)

(52) U.S. Cl.
CPC .............. *G02B 6/26* (2013.01); *G02B 27/09* (2013.01); *G02B 27/0994* (2013.01)

(58) Field of Classification Search
CPC .......... G02B 6/26; G02B 27/01; G02B 27/09; G02B 27/0944
See application file for complete search history.

(56) References Cited

U.S. PATENT DOCUMENTS

| | | | |
|---|---|---|---|
| 10,545,289 B1 * | 1/2020 | Chriqui | G02B 27/0087 |
| 11,360,308 B2 * | 6/2022 | Maimone | G02B 27/14 |
| 2008/0239749 A1 * | 10/2008 | Saccomanno | G02B 6/0028 362/609 |
| 2017/0363810 A1 * | 12/2017 | Holland | G02B 6/3825 |
| 2018/0252857 A1 * | 9/2018 | Glik | G02B 1/002 |
| 2019/0129088 A1 * | 5/2019 | Lu | G02B 27/0101 |

FOREIGN PATENT DOCUMENTS

| | | | | |
|---|---|---|---|---|
| CN | 107102405 A | * | 8/2017 | ............... G02B 6/26 |
| CN | 216526542 U | * | 5/2022 | |
| WO | WO-2014009717 A1 | * | 1/2014 | ......... G02B 27/0081 |
| WO | WO-2017199232 A1 | * | 11/2017 | ............. G02B 27/01 |

* cited by examiner

*Primary Examiner* — Thomas A Hollweg
*Assistant Examiner* — Mary A El-Shammaa
(74) *Attorney, Agent, or Firm* — Winston Hsu (57) ABSTRACT

A waveguide combiner includes an in-coupling area, a waveguide body and an out-coupling area. The in-coupling area is configured to introduce a light beam. The waveguide body is configured to guide the light beam introduced by the in-coupling area. The out-coupling area is configured to output the light beam guided by the waveguide body. The waveguide body includes at least one of a beam-expanding part configured to expand the light beam to a predetermined direction by reflecting the light beam and a beam-folding part configured to change the light beam to a different direction by reflecting the light beam.

6 Claims, 12 Drawing Sheets

WAVEGUIDE COMBINER WITH LIGHT BEAM PROCESSING AREA

BACKGROUND OF THE INVENTION

1. Field of the Invention

The present invention is related to a waveguide combiner, and more particularly, to a waveguide combiner with a light beam processing area.

2. Description of the Prior Art

In augmented-reality (AR) applications, a waveguide combiner is the most advanced component to combine see-through images and artificial images. The total internal reflection (TIR) of the waveguide combiner is used to guide the light beam projected by the optical machine to the transparent light output area and project to the user's eye by exit-pupil expansion and pupil replication. This technology has the advantages of small size, light weight, large eye box, and wide field of view (FoV). An optical waveguide comprises geometrical optical waveguide (reflective waveguide) and diffractive waveguide. An advantage of the diffractive waveguide is a function of two-dimensional exit-pupil expansion (2D-EPE), which expands the eye box in two dimensions with uniform brightness and reduces the size and weight of light engines. However, diffractive waveguides usually have problems such as color non-uniformity and low brightness. In order to reduce color non-uniformity, red color, green color and blue color (RGB colors) need to be separately guided in two or three waveguides, thus increasing thickness and weight of the combiner. On the other hand, the reflective waveguide has higher brightness and good color uniformity. Since the reflection angles are independent of wavelengths, materials with high refractive indices are not necessary for the reflective waveguide. However, most reflective waveguides only expand the exit pupil (or light beams) in one dimension (i.e., 1D-EPE), and additional optical components, such as multiple curved mirrors or lenses, are necessary in order to expand the exit pupil in the other dimension. There is still a lack of methods for 2D-EPE of the reflective waveguide that can be integrated with wafer-level production while keeping high brightness, good brightness uniformity, good color uniformity, large FoV, and large eye box in a single piece of waveguide. Moreover, these reflective structures can be easily fabricated by either wafer-level nano-imprint lithography or injection molding technologies.

SUMMARY OF THE INVENTION

It is therefore an objective of the present invention to provide a waveguide combiner with a light beam processing area for allowing a light beam in the waveguide combiner to be expanded and folded.

At least one embodiment of the present invention provides a waveguide combiner comprising an in-coupling area, a waveguide body and an out-coupling area. The in-coupling area is configured to introduce a light beam. The waveguide body is configured to guide the light beam introduced by the in-coupling area. The out-coupling area is configured to output the light beam guided by the waveguide body. The waveguide body comprises at least one of a beam-expanding part configured to expand the light beam to a predetermined direction by reflecting the light beam and a beam-folding part configured to change the light beam to a different direction by reflecting the light beam.

The waveguide combiner with a light beam processing area that is proposed by the present invention may guide the light beam for two-dimensional exit-pupil expansion (2D-EPE). The guided light beam can be efficiently expanded and/or folded through the beam-expanding part and the beam-folding part in one piece of waveguide without color dispersion, such that the size of the in-coupling area (or a light beam projector) can be reduced and the arrangement of locations of the in-coupling area and the out-coupling area can be more flexible.

These and other objectives of the present invention will no doubt become obvious to those of ordinary skill in the art after reading the following detailed description of the preferred embodiment that is illustrated in the various figures and drawings.

DETAILED DESCRIPTION

In the description below, it will be understood that "a direction X" and "a direction Y" are two directions forming an X-Y plane in which an in-coupling area and an out-coupling area are formed. It is noticed that solid arrows denoted "X" and "Y" in the figures of the present invention refers to the direction X and the direction Y. It will also be understood that "a direction Z" is a direction that is perpendicular to the direction X and the direction Y. It is noticed that a solid arrow denoted "Z" in the figures of the present invention refers to the direction Z.

Figure 1:
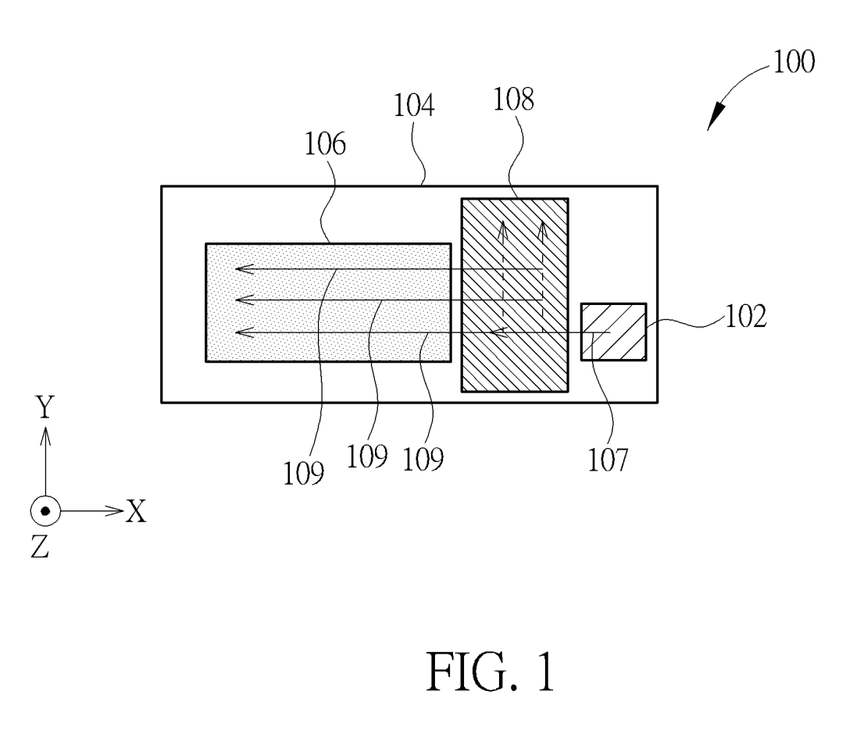
FIG. 1 is a diagram of a waveguide combiner according to a first embodiment of the present invention.

Please refer to FIG. 1. FIG. 1 is a diagram of a waveguide combiner 100 according to a first embodiment of the present invention. As shown in FIG. 1, the waveguide combiner 100 of the first embodiment comprises an in-coupling area 102, a waveguide body 104 and an out-coupling area 106. In the present embodiment, the waveguide body 104 comprises a beam-expanding area 108 configured to expand the light beam to a predetermined direction by reflecting the light beam. For example, a light beam 107 is introduced by the in-coupling area 102 along an opposite direction of the direction X. When the light beam 107 is incident to the beam-expanding area 108, a portion of the light beam 107 is incident to a beam-expanding structure and is expanded into a plurality of light beams 109 along the direction Y. It should be noted that, a propagation direction of the light beam 109 is the same as a propagation direction of the light beam 107. In other words, the beam-expanding area 108 is able to expand the light beam 107 along the direction Y and keeps the propagation direction of the light beam 107. The plurality of light beams 109 may undergo an operation of two-dimensional exit-pupil expansion (2D-EPE), such that the plurality of light beams 109 are output from the waveguide combiner 100. In addition, an angle at which a light beam enters the in-coupling area 102 is the same as an angle at which the output light beam 109 exits from the out-coupling area 106.

Figure 2:
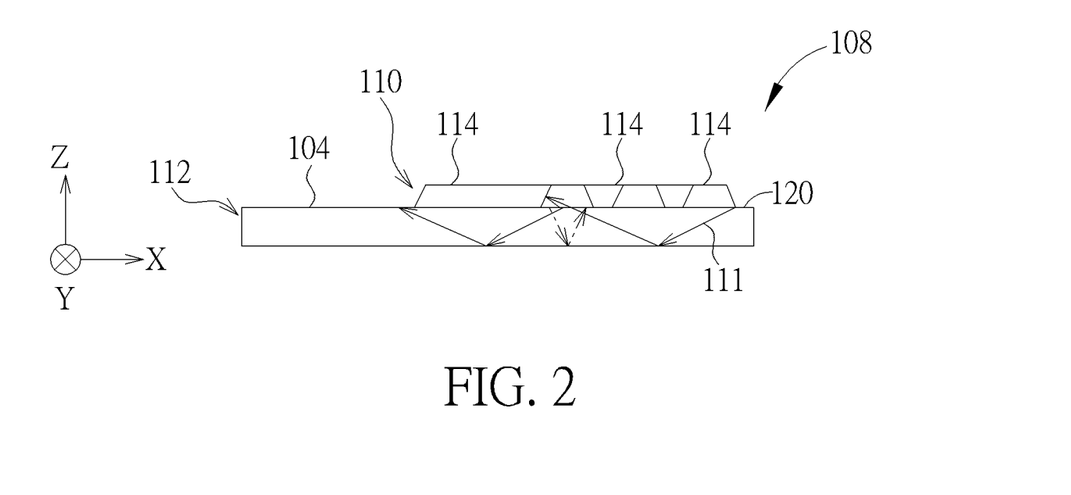
FIG. 2 is a diagram illustrating a plurality of beam-expanding structures and a light beam reflected by the plurality of beam-expanding structures according to the first embodiment of the present invention.
Figure 3:
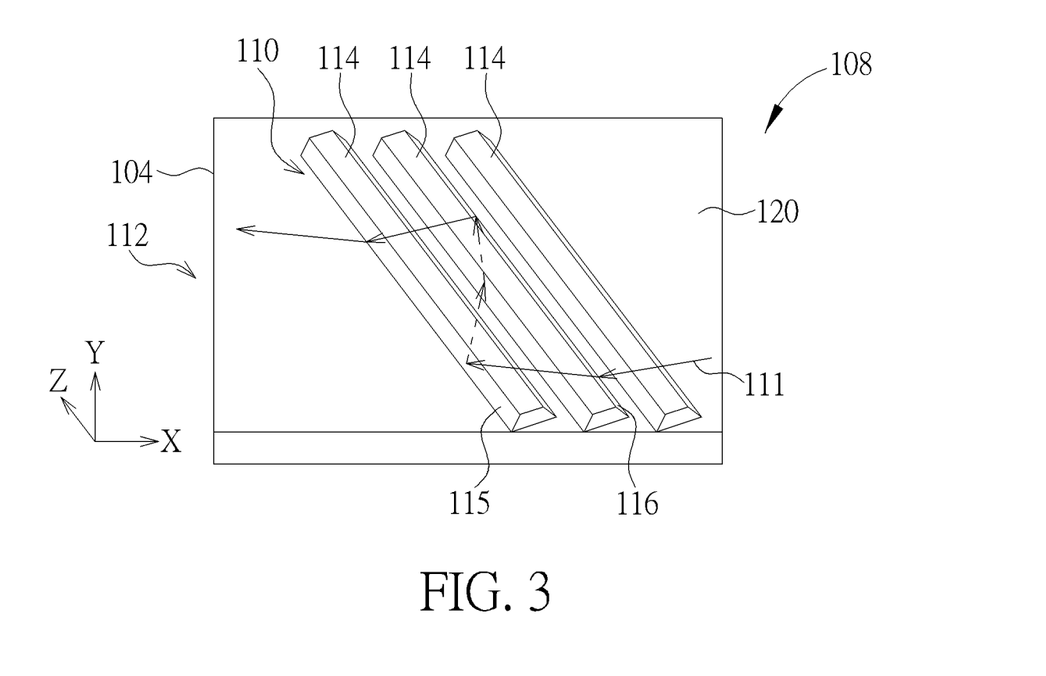
FIG. 3 is a diagram illustrating the plurality of beam-expanding structures and the light beam reflected by the plurality of beam-expanding structures in a different view angle according to the first embodiment of the present invention.

Please refer to FIG. 2 in conjunction with FIG. 3. FIG. 2 is a diagram illustrating a plurality of beam-expanding structures 114 and a light beam 111 reflected by the plurality of beam-expanding structures 114 according to the first embodiment of the present invention. FIG. 3 is a diagram illustrating the plurality of beam-expanding structures 114 and the light beam 111 reflected by the plurality of beam-expanding structures 114 in a different view angle according to the first embodiment of the present invention. As shown in FIG. 2, the beam-expanding area 108 of the waveguide combiner 100 comprises a beam-expanding part 110 and a substrate part 112. The beam-expanding part 110 comprises a plurality of first beam-expanding structures 114 formed on one surface 120 of the substrate part 112. The plurality of first beam-expanding structures 114 comprise stripe structures each with a trapezoidal cross-section, and are parallel to each other and arranged along a first predetermined direction. Assuming that a light beam 111 is a portion of the light beam 107 and the light beam 111 is incident on one of the stripe structures. Each stripe structure of the plurality of first beam-expanding structures 114 further comprises a first surface 115 and a second surface 116. The first surface 115 is configured to allow a light beam 111 introduced by the in-coupling area 102 (not shown in FIG. 2) to be reflected, and the second surface 116 is configured to allow the light beam reflected by the first surface 115 (such as the dotted line in FIG. 2 and FIG. 3) to be further reflected by the second surface 116. As a result, the light beam 111 (the portion of the light beam 107) is expended along the direction Y, and keeps being guided to the out-coupling area 106 along the opposite direction of the direction X. In the present embodiment, each of the stripe structures (i.e. the first beam-expanding structures 114) may have a height of 0.01 mm to 4 mm, and may have an angle of first/second surface of 10 degree to 89 degree, but the present invention is not limited thereto. The angles of first/second surface of the plurality of the beam-expanding structures 114 may be the same, and the heights of first/second surface of the plurality of the beam-expanding structures 114 may be different. A gap between the stripe structures can be fixed or variable depending on designs, in order to keep brightness uniformity.

In some embodiments, the beam-expanding area 108 may further comprise a coated area. When the light beam introduced by the in-coupling area 102 may not be totally internal-reflected by the beam-expanding structures 114, or the light beam reflected by beam-expanding structure 114 may not be guided inside the waveguide body 104, reflective coating layers may be added on partial (e.g., the surfaces 115 and 116 of the beam-expanding structures 114) or whole of the beam-expanding area 108.

Figure 4:
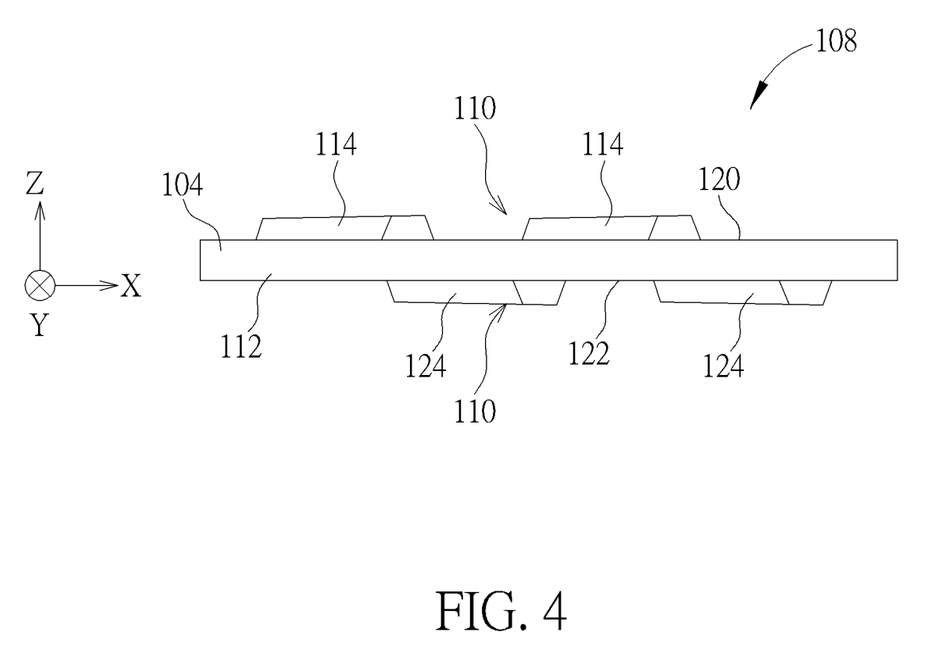
FIG. 4 is a diagram illustrating a plurality of second beam-expanding structures arranged on another surface.

In some other embodiments, the stripe structure may be formed on more than one surface of the substrate part 112. Please refer to FIG. 4. FIG. 4 is a diagram illustrating a plurality of second beam-expanding structures 124 arranged on another surface according to the first embodiment of the present invention. As shown in FIG. 4, the waveguide body 104 comprises the surface 120 and another surface 122 opposite to the surface 120. For example, in the direction Z (i.e. thickness direction) of the waveguide body 104, the surface 120 may be a top surface, and the surface 122 may be a bottom surface. The beam-expanding part 110 further comprises the plurality of second beam-expanding structures 124 formed on the surface 122 of the substrate part 112. Similarly, the plurality of second beam-expanding structures 124 comprise stripe structures each with a trapezoidal cross-section, and are parallel to each other and arranged along the first predetermined direction. It is noticed that a shape of the trapezoidal cross-section of each stripe structure on one surface 120 and a shape of the trapezoidal cross-section of each stripe structure on another surface 122 have reflection symmetry. The plurality of second beam-expanding structures 124 are able to expand the light beam introduced by the in-coupling area 102 (not shown in FIG. 4). In other words, when a light beam introduced by the in-coupling area 102 is incident on one of the stripe structures on another surface 122, the light beam is reflected for being expanded along the direction Y.

Figure 5:
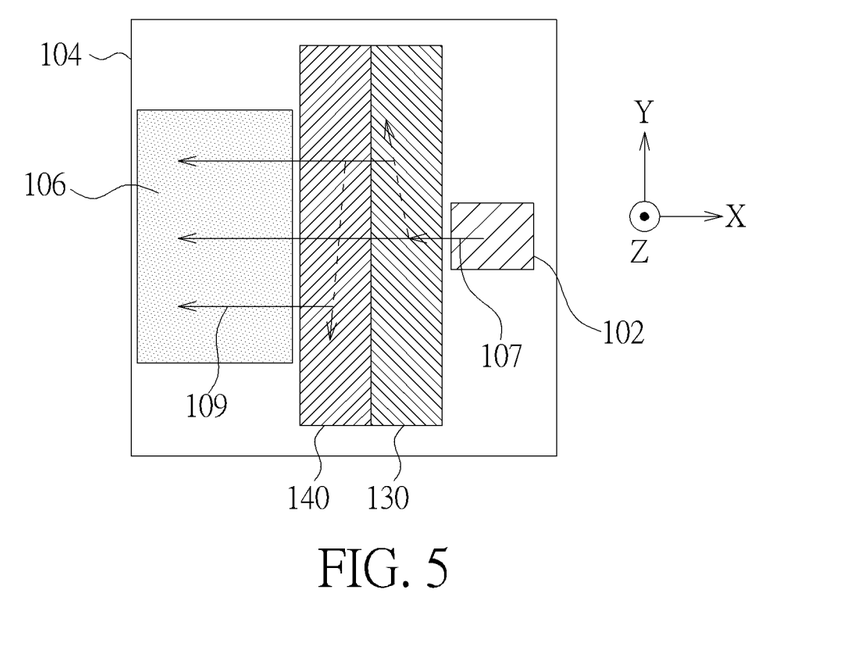
FIG. 5 is a diagram illustrating a waveguide combiner comprising two beam-expanding areas.
Figure 6:
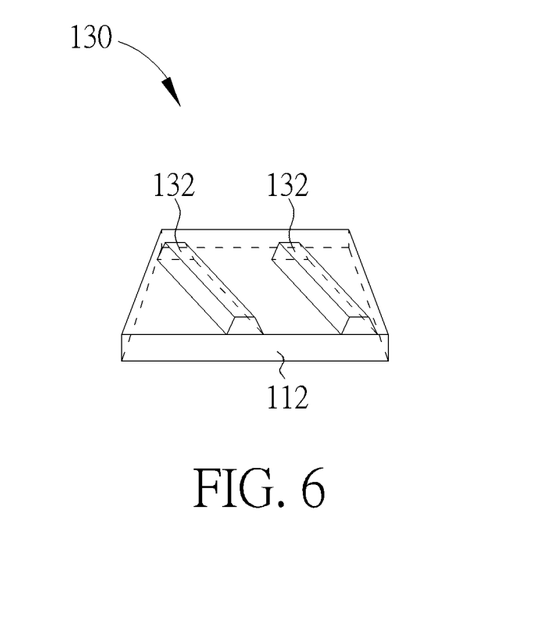
FIG. 6 is a diagram showing structures of a beam-expanding part in FIG. 5.
Figure 7:
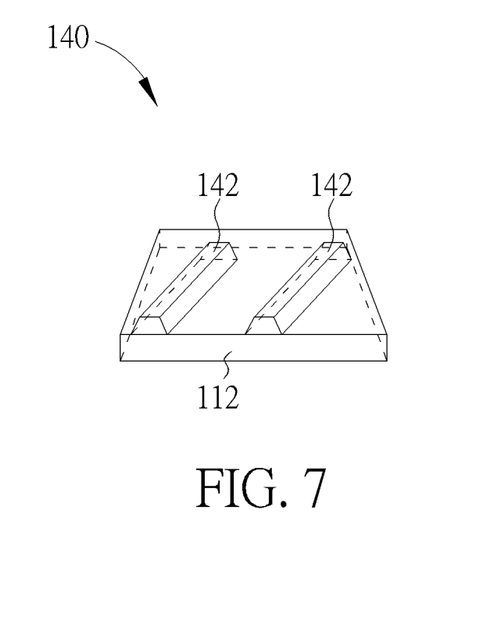
FIG. 7 is a diagram showing structures of another beam-expanding part in FIG. 5.

In some other embodiments, the waveguide combiner may comprise more than one beam-expanding area. Please refer to FIG. 5 in conjunction with FIG. 6 and FIG. 7. FIG. 5 is a diagram illustrating a waveguide combiner comprising two beam-expanding areas 130, 140 according to an embodiment of the present invention. FIG. 6 is a diagram showing structures of a beam-expanding part 132 in FIG. 5. FIG. 7 is a diagram showing structures of another beam-expanding part 142 in FIG. 5. As shown in FIG. 5, a first beam-expanding area 130 and a second beam-expanding area 140 are formed between the in-coupling area 102 and the out-coupling area 106. As shown in FIG. 6, the first beam-expanding area 130 comprises a first beam-expanding part 132 and the substrate part 112. Similarly, the first beam-expanding part 132 is configured to expand the light beam introduced by the in-coupling area 102 to a predetermined direction by reflecting the light beam. For example, when the light beam 107 introduced by the in-coupling area 102 is incident on the first beam-expanding area 130, a portion of the light beam 107 is expanded along the direction Y and a portion of the light beam 107 keeps being guided along the opposite direction of the direction X. As shown in FIG. 7, the second beam-expanding area 140 comprises a second beam-expanding part 142 and the substrate part 112. The first beam-expanding part 132 and the second beam-expanding part 142 may be arranged either on the same surface or on different surfaces of the substrate part 112. The second beam-expanding part 142 is configured to expand the light beam introduced by the in-coupling area 102 and reflected by the first beam-expanding area 130 to another predetermined direction. For example, when a light beam reflected by the first beam-expanding area 130 is incident on the second beam-expanding part 142, the light beam is expanded along the opposite direction of the direction Y and keeps being guided along the opposite direction of the direction X. As a result, the light beam 107 introduced by the in-coupling area 102 may be expanded along the direction Y and the opposite direction of the direction Y.

According to above arrangements, the plurality of beam-expanding structures of the beam-expanding part 110 of the beam-expanding area 108 are able to expand the light beam introduced by the in-coupling area 102 by reflecting a portion of the light beam. The light beam guided in the waveguide combiner 100 may be expanded along a predetermined direction and keep going along the original propagation direction.

Figure 8:
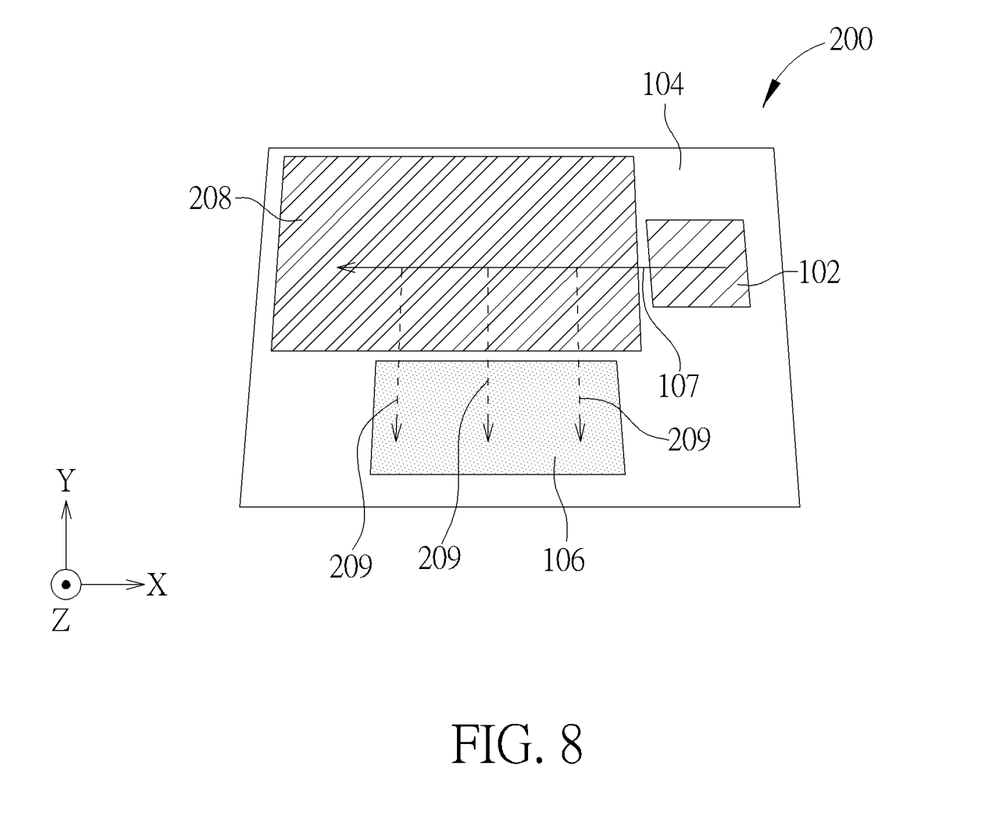
FIG. 8 is a diagram of a waveguide combiner according to a second embodiment of the present invention.

Please refer to FIG. 8. FIG. 8 is a diagram of a waveguide combiner 200 according to a second embodiment of the present invention. As shown in FIG. 2, the waveguide combiner 200 of the second embodiment comprises an in-coupling area 102, a waveguide body 104 and an out-coupling area 106. In the present embodiment, the waveguide body 104 comprises a beam-folding area 208 configured to fold the light beam to a predetermined direction by reflecting the light beam. For example, a light beam 107 is introduced by the in-coupling area 102 along the opposite direction of the direction X. When the light beam 107 is incident on the beam-folding area 208, a portion of the light beam 107 is incident on a beam-folding structure and is folded into a plurality of light beams 209 along the opposite direction of the direction Y. It should be noted that, a propagation direction of a portion of the light beam 107 is changed into the opposite direction of the direction Y, and a propagation direction of a portion of the light beam 107 keeps being guided along the original propagation direction. In other words, the beam-folding area 208 is able to fold a portion of the light beam 107 toward the opposite direction of the direction Y, and the light beam 107 is folded into the light beams 209. The plurality of light beams 209 may undergo a 2D-EPE, such that the plurality of light beams 209 are output from the waveguide combiner 200. In addition, an angle at which a light beam enters the in-coupling area 102 is the same as an angle at which the output light beam 209 exits from the out-coupling area 106.

Figure 9:
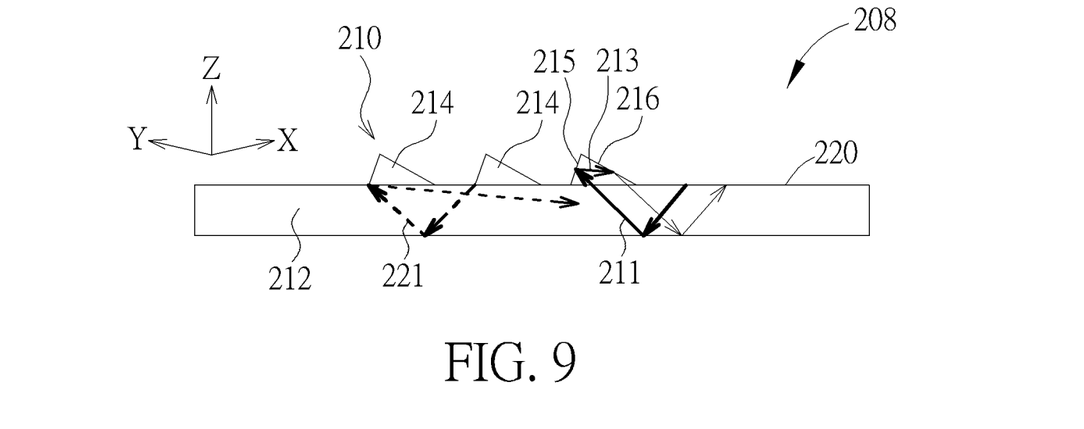
FIG. 9 is a diagram illustrating a plurality of beam-folding structures and a light beam reflected by the plurality of beam-folding structures according to the second embodiment of the present invention.
Figure 10:
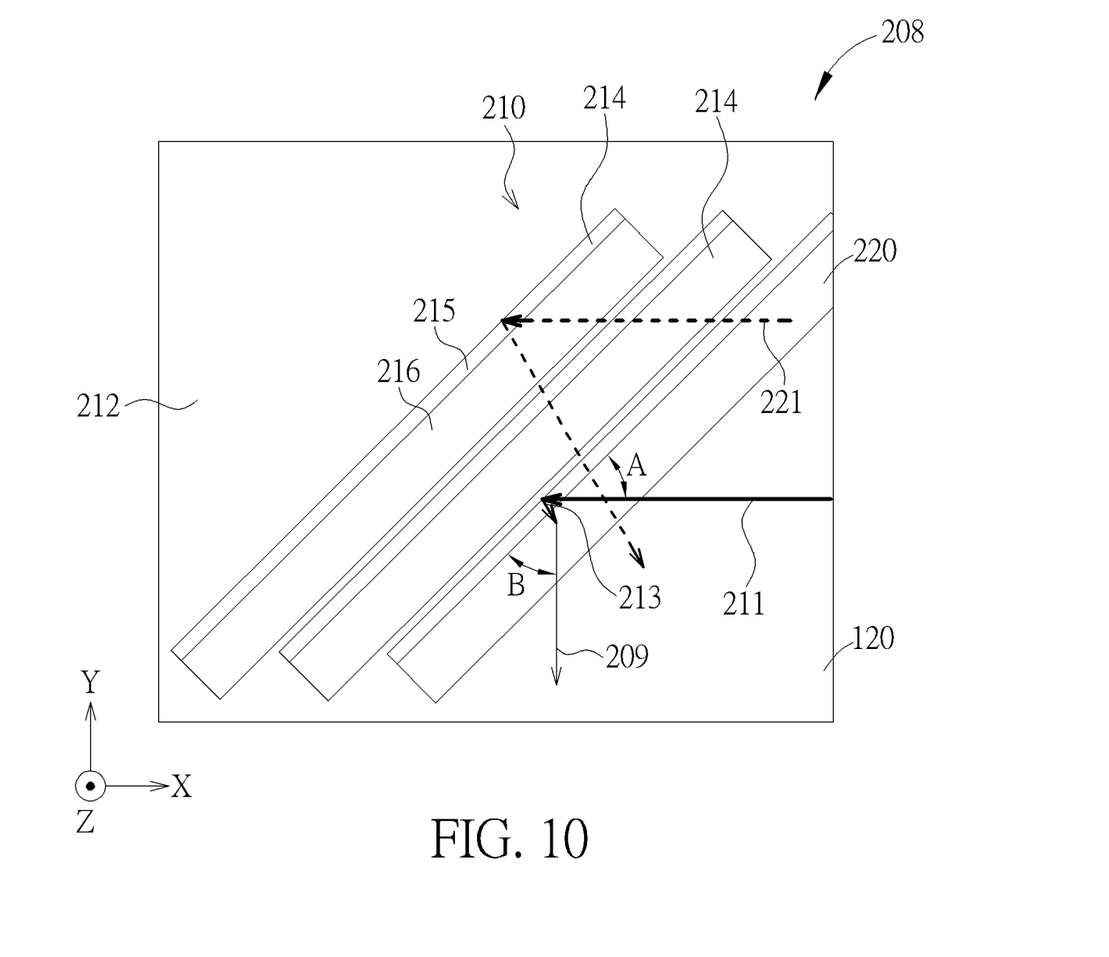
FIG. 10 is a diagram illustrating the plurality of beam-folding structures and the light beam reflected by the plurality of beam-folding structures in a different view angle according to the second embodiment of the present invention.

Please refer to FIG. 9 in conjunction with FIG. 10. FIG. 9 is a diagram illustrating a plurality of beam-folding structures 214 and a light beam 211 reflected by the plurality of beam-folding structures 214 according to the second embodiment of the present invention. FIG. 10 is a diagram illustrating the plurality of beam-folding structures 214 and the light beam 211 reflected by the plurality of beam-folding structures 214 in a different view angle according to the second embodiment of the present invention. As shown in FIG. 9, the beam-folding area 208 of the waveguide combiner 200 comprises a beam-folding part 210 and a substrate part 212. The beam-folding part 210 comprises a plurality of first beam-folding structures 214 formed on one surface 220 of the substrate part 212. The plurality of first beam-folding structures 214 comprise stripe structures each with a right triangle cross-section, and are parallel to each other and arranged along a predetermined direction. Assuming that a light beam 211 is a portion of the light beam 107 and the light beam 211 is incident on one of the stripe structures of the plurality of first beam-folding structures 214. Each stripe structure of the plurality of first beam-folding structures 214 further comprises a first surface 215 and a second surface 216. The first surface 215 is configured to allow a light beam 211 introduced by the in-coupling area 102 (not shown in FIG. 9) to be reflected, and the second surface 216 is configured to allow the light beam reflected by the first surface 215 (such as the light beam 213) to be further reflected by the second surface 216 to form the light beam 209. The second surface 216 is perpendicular to the first surface 215. As a result, the light beam 211 (the portion of the light beam 107) is folded to the opposite direction of the direction Y, and keeps being guided to the out-coupling area 106.

Assuming that a light beam 221 is incident on an edge of the stripe structure, the reflection of the light beam 221 is not folded to the predetermined direction, leading to a lower folding efficiency and undesired light beams being guided to the out-coupling area 106. If a slope of the second surface 216 is smaller than a slope of the first surface 215, the light beam 221 may have a better chance to be folded (i.e., successively reflected by the first surface 215 and a second surface 216) to the predetermined direction, leading to a higher folding efficiency.

It is noted that, an angle A between a propagation direction of the light beam 211 and an alignment direction of the stripe structures is the same as an angle B between a propagation direction of the light beam 209 and the alignment direction of the stripe structures. In the present embodiment, each of the stripe structures of the plurality of first beam-folding structures 214 may have a depth of 0.01 mm to 4 mm, and may have an included angle between the first surface and the second surface about 90 degree±10 degree, better about 90 degree±1 degree, best about 90 degree±0.1 degree, but the present invention is not limited thereto. The angles of first/second surface of the plurality of the beam-folding structures may be the same, and the heights of first/second surface of the plurality of the beam-folding structures may be different. Similarly, a gap between the stripe structures may be fixed or variable depending on designs, in order to keep brightness uniformity.

Figure 11:
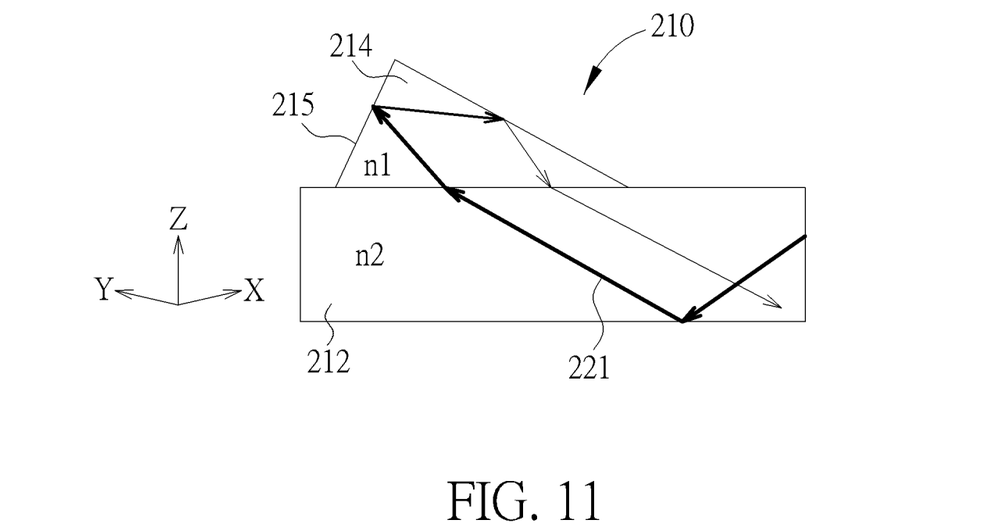
FIG. 11 is a diagram illustrating a refractive index of each of the stripe structures being greater than a refractive index of the substrate part according to an embodiment of the present invention.
Figure 12:
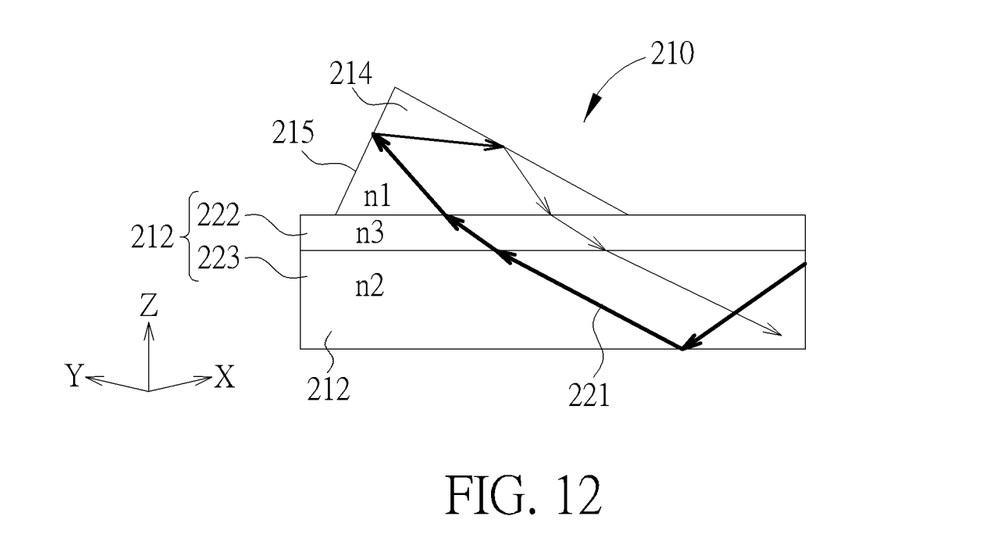
FIG. 12 is a diagram illustrating the substrate part comprising a first layer and a second layer with different refractive indexes according to an embodiment of the present invention.

Each of the stripe structures may be fabricated with a proper refractive index for allowing more light beams to be folded to the predetermined direction by the stripe structure. Please refer to FIG. 11. FIG. 11 is a diagram illustrating a refractive index of each of the stripe structures being greater than a refractive index of the substrate part according to an embodiment of the present invention. As shown in FIG. 11, the beam-folding part 210 comprises a plurality of first beam-folding structures 214, each having a first refractive index n1 and formed on the substrate part 212 with a second refractive index n2. When the first refractive index n1 is greater than the second refractive index n2, the light beam 221 may have a better chance to be successively reflected by the first surface 215 and a second surface 216 due to the difference in refractive indexes, such that the light beam 221 can be folded by the first beam-folding structures 214 with a higher folding efficiency. Furthermore, please refer to FIG. 12. FIG. 12 is a diagram illustrating the substrate part 212 comprising a first layer 222 and a second layer 223 with different refractive indexes according to an embodiment of the present invention. As shown in FIG. 12, the substrate part 212 comprises a first layer 222 with a third refractive index n3 and a second layer 223 with the second refractive index n2, and each of the plurality of first beam-folding structures 214 has the first refractive index n1. When the first refractive index n1 is greater than the third refractive index n3 and the third refractive index n3 is greater than the second refractive index n2, the light beam 221 may have a better chance to be successively reflected by the first surface 215 and a second surface 216 due to the difference in refractive indexes, such that the light beam 221 can be folded by the first beam-folding structures 214 with a higher folding efficiency.

In some embodiments, the beam-folding area 208 may further comprise a coated area. When an angle between a propagation direction of a light beam introduced by the in-coupling area 102 and the alignment direction of the stripe structures is not small enough, the light beam being incident on the first surface 215 may not be totally reflected. Therefore, reflective coating layers may be added on the first surface 215 in an area which is not prone to total reflection, to form the coated area. Furthermore, reflective coating layers may also be added on partial or whole of the beam-folding area in order to reduce fabrication difficulties, depending on designs.

Figure 13:
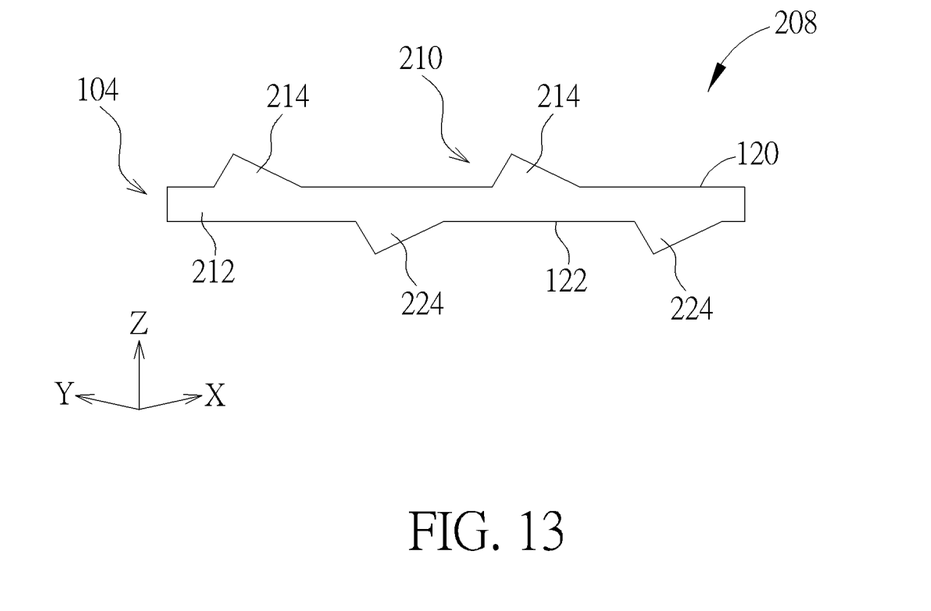
FIG. 13 is a diagram illustrating a plurality of second beam-folding structures arranged on another surface according to the second embodiment of the present invention.

In some other embodiments, the stripe structure may be formed on more than one surface of the substrate part 212. Please refer to FIG. 13. FIG. 13 is a diagram illustrating a plurality of second beam-folding structures 224 arranged on another surface 122 according to the second embodiment of the present invention. As shown in FIG. 13, the waveguide body 104 comprises the surface 120 and another surface 122 opposite to the surface 120. For example, in the direction Z (i.e. thickness direction) of the waveguide body 104, the surface 120 may be a top surface, and the surface 122 may be a bottom surface. The beam-folding part 210 further comprises the plurality of second beam-folding structures 224 formed on another surface 122 of the substrate part 212. Similarly, the plurality of second beam-folding structures 224 comprise stripe structures each with a right triangle cross-section, and are parallel to each other and arranged along the predetermined direction. It is noticed that a shape of the right triangle cross-section of each stripe structure on one surface 120 and a shape of the right triangle cross-section of each stripe structure on another surface 122 have reflection symmetry. The plurality of second beam-folding structures 224 are able to fold the light beam introduced by the in-coupling area 102 (not shown in FIG. 13). In other words, when a light beam introduced by the in-coupling area 102 is incident on one of the stripe structures on another surface 122, the light beam is reflected for being folding to the opposite direction of the direction Y.

Figure 14:
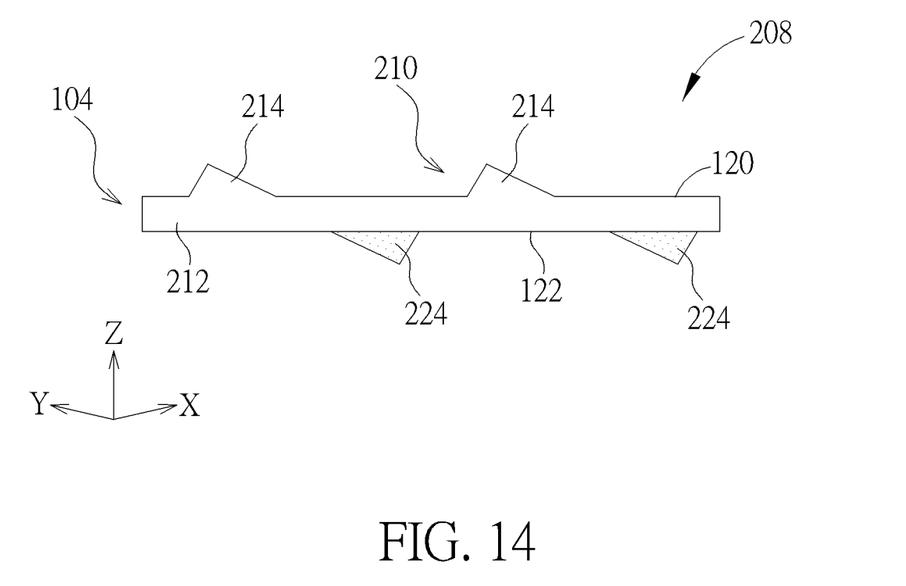
FIG. 14 is a diagram illustrating a plurality of second beam-folding structures in another shape arranged on another surface according to the second embodiment of the present invention.
Figure 15:
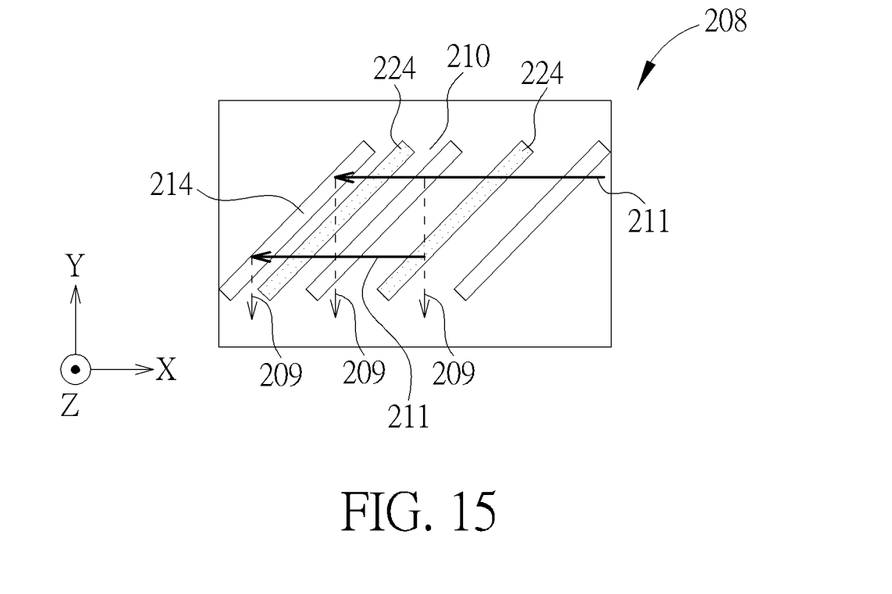
FIG. 15 is a diagram illustrating light beams reflected by the plurality of second beam-folding structures according to the second embodiment of the present invention.

Furthermore, please refer to FIG. 14 in conjunction with FIG. 15. FIG. 14 is a diagram illustrating a plurality of second beam-folding structures 224 in another shape arranged on another surface 122 according to the second embodiment of the present invention. FIG. 15 is a diagram illustrating light beams reflected by the plurality of second beam-folding structures 224 according to the second embodiment of the present invention. As shown in FIG. 14, a shape of the right triangle cross-section of each stripe structure on one surface 120 and a shape of the right triangle cross-section of each stripe structure on another surface 122 may have rotational symmetry. The rotated stripe structures possessed by the second beam-folding structures 224 on the surface 122 are also able to fold the light beam to the opposite direction of the direction Y. As shown in FIG. 15 the second beam-folding structure 224 is configured to turn the light beam 209 which is reflected by the first beam-folding structure 214 back to the original direction (i.e., the opposite direction of the direction X). The function of the second beam-folding structure 224 is different from the function of first beam-folding structure 214, such that the beam-folding and the beam-expanding may be achieved at the same time, and the area of beam-folding part can be reduced, and the 2D-EPE can be achieved more effectively.

Figure 16:
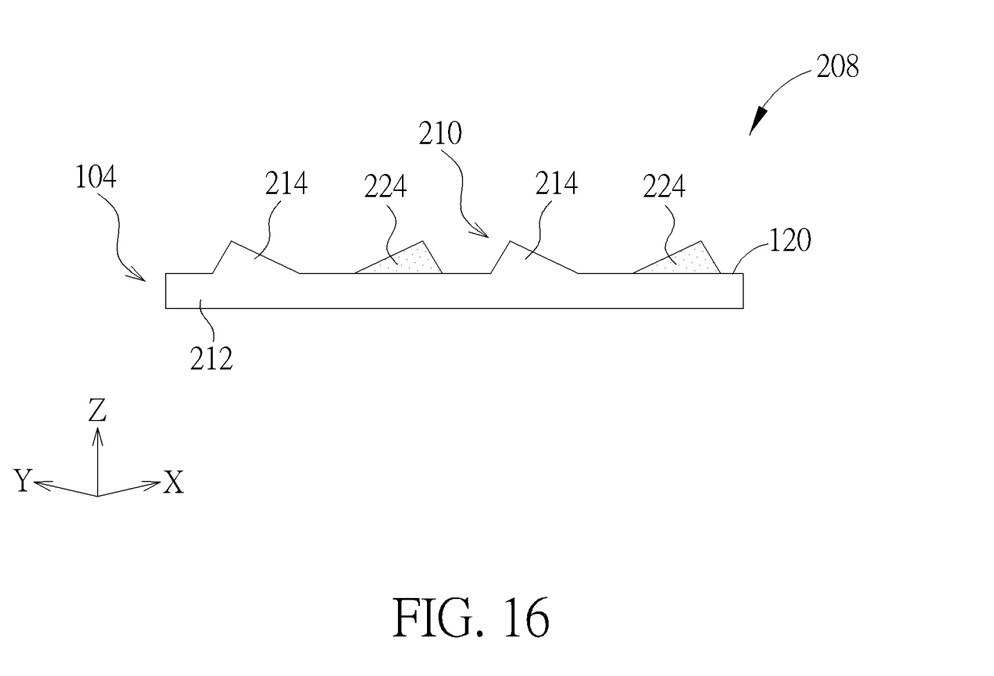
FIG. 16 is a diagram illustrating a plurality of second beam-folding structures arranged on one surface according to the second embodiment of the present invention.
Figure 17:
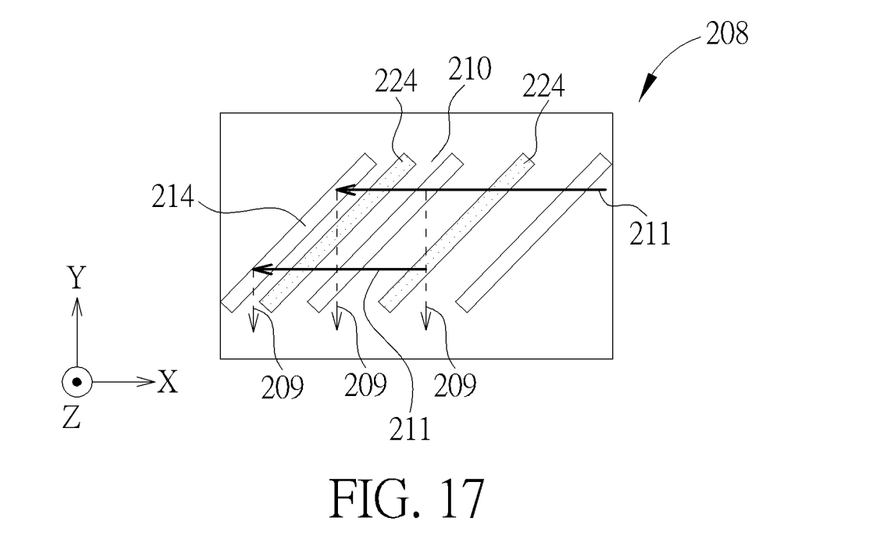
FIG. 17 is a diagram illustrating light beams reflected by the plurality of second beam-folding structures according to the second embodiment of the present invention.

In some other embodiments, the second beam-folding structures 214 and 224 may be arranged on the same surface. Please refer to FIG. 16 in conjunction with FIG. 17. FIG. 16 is a diagram illustrating a plurality of second beam-folding structures 224 arranged on one surface 120 according to the second embodiment of the present invention. FIG. 17 is a diagram illustrating light beams reflected by the plurality of second beam-folding structures 224 according to the second embodiment of the present invention. As shown in FIG. 16, the waveguide body 104 comprises a plurality of second beam-folding structures 224 formed on one surface 120 of the substrate part 212, the plurality of second beam-folding structures 224 comprise stripe structures each with a right triangle cross-section, and are parallel to each other and arranged along the predetermined direction, and a shape of the right triangle cross-section of each first beam-folding structure 214 and a shape of the right triangle cross-section of each second beam-folding structure 224 have reflection symmetry. As shown in FIG. 17, similarly, the second beam-folding structure 224 is configured to turn the light beam 209 which is reflected by the first beam-folding structure 214 back to the original direction (i.e., the opposite direction of the direction X). The function of the second beam-folding structure 224 is different from the function of first beam-folding structure 214, such that the beam-folding and the beam-expanding may be achieved at the same time, and the area of beam-folding part can be reduced, and the 2D-EPE can be achieved more effectively.

Figure 18:
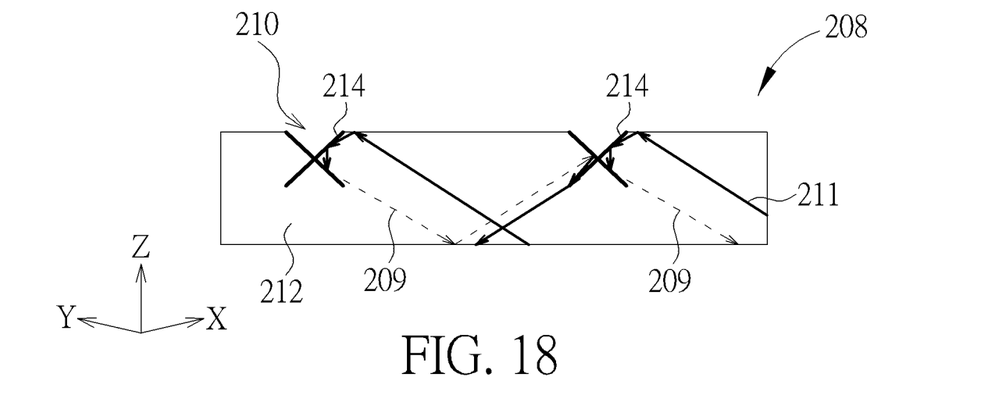
FIG. 18 is a diagram illustrating a plurality of beam-folding structures and a light beam reflected by the plurality of beam-folding structures according to the second embodiment of the present invention.
Figure 19:
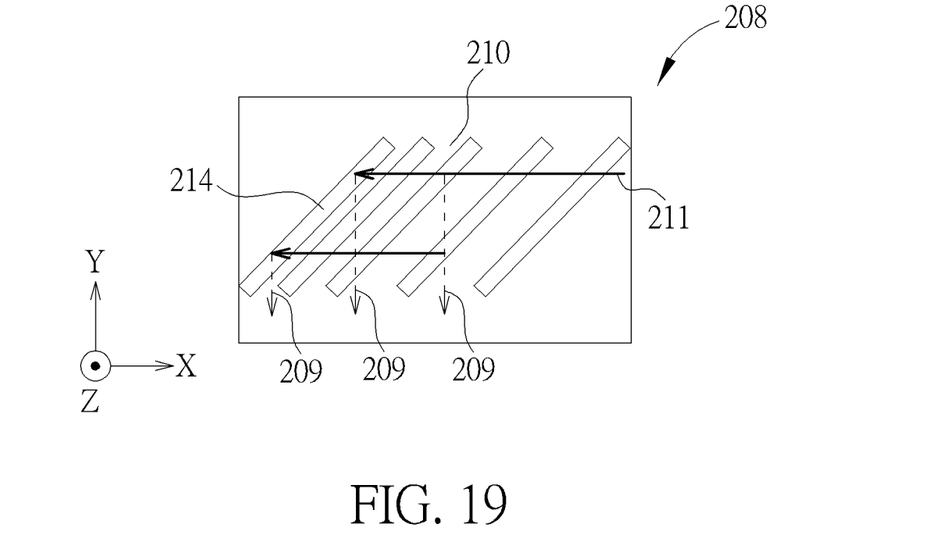
FIG. 19 is a diagram illustrating the plurality of beam-folding structures and the light beam reflected by the plurality of beam-folding structures in a different view angle according to the second embodiment of the present invention.

In some embodiments, the beam-folding part may be embedded in the substrate part. Please refer to FIG. 18 in conjunction with FIG. 19. FIG. 18 is a diagram illustrating a plurality of beam-folding structures 214 and a light beam 211 reflected by the plurality of beam-folding structures 214 according to the second embodiment of the present invention. FIG. 19 is a diagram illustrating the plurality of beam-folding structures 214 and the light beam 211 reflected by the plurality of beam-folding structures 214 in a different view angle according to the second embodiment of the present invention. As shown in FIG. 18 and FIG. 19, the waveguide body 104 comprises a substrate part 212 and the beam-folding part 210 embedded in the substrate part 212. The beam-folding part 212 comprises a plurality of beam-folding structures 214. The plurality of beam-folding structures 214 comprise trench structures each having two reflective surfaces perpendicular to and crossing with each other, and are parallel to each other and arranged along the predetermined direction. The trench structures are made of reflective layers. When the light beam 211 is incident on a beam-folding structure 214, a portion of the light beam 211 is folded into the light beams 209 along the opposite direction of the direction Y and a portion of the light beam 211 passes through the trench structures. Furthermore, the beam-folding structure 214 of the crossing layer type is also configured to turn the light beam 209 which is reflected by another first beam-folding structure 214 back to the original direction (i.e., the opposite direction of the direction X). In other words, the beam-folding structure 214 of the crossing layer type may reflect the incident light beam and the reflected light beam 209. the beam-folding structure 214 of the crossing layer type combines two functions in one structure, such that the beam-folding and the beam-expanding may be achieved at the same time, and the area of beam-folding part can be reduced, and the 2D-EPE can be achieved more effectively.

Figure 20:
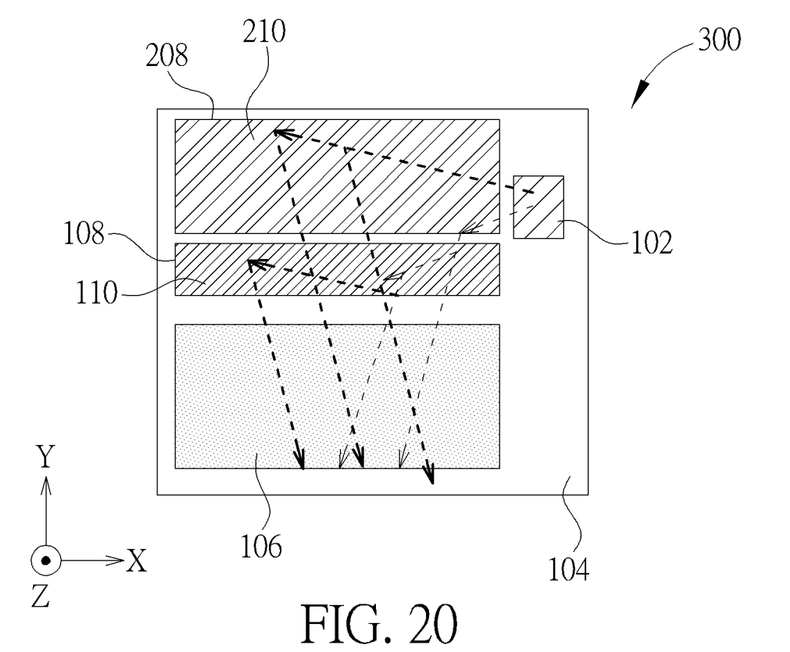
FIG. 20 is a diagram of a waveguide combiner according to a third embodiment of the present invention.
Figure 21:
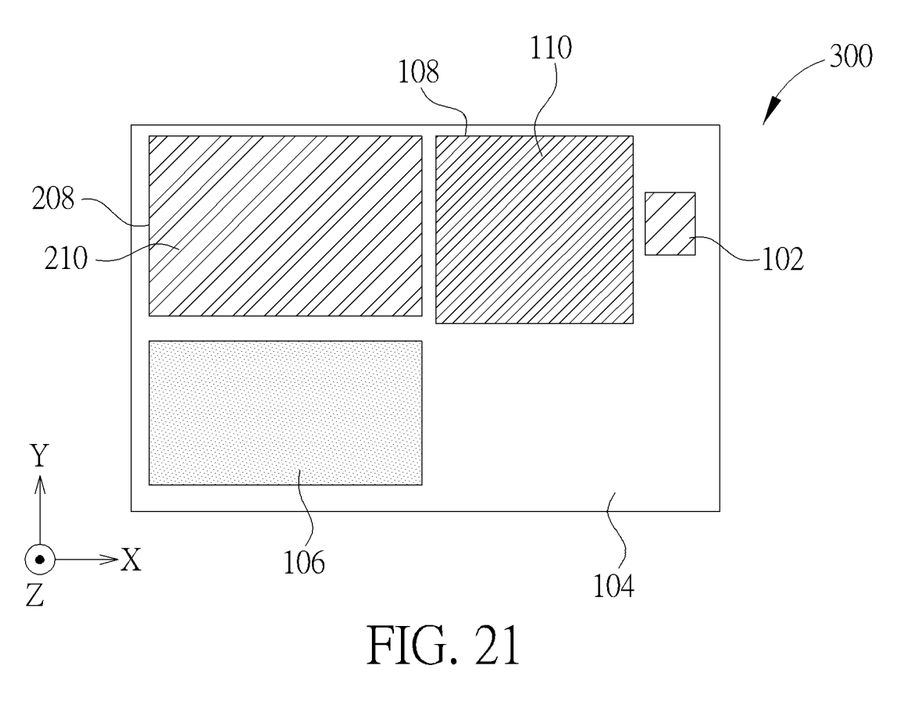
FIG. 21 is a diagram of a waveguide combiner having a different arrangement according to a third embodiment of the present invention.

Please refer to FIG. 20. FIG. 20 is a diagram of a waveguide combiner 300 according to a third embodiment of the present invention. As shown in FIG. 20, the waveguide combiner 300 of the third embodiment comprises an in-coupling area 102, a waveguide body 104 and an out-coupling area 106. In the present embodiment, the waveguide body 104 comprises a beam-folding area 208 and a beam-expanding area 108. The beam-expanding area 108 comprises a beam-expanding part 110. The beam-folding area 208 comprises a beam-folding part 210. The beam-folding part 210 is arranged beside the in-coupling area 102 and configured to reflect the light beam introduced by the in-coupling area 102 to the beam-expanding part 110. The beam-expanding part 110 is arranged between the beam-folding part 210 and the out-coupling area 106, and the beam-expanding part 110 is configured to expand the light beam from the beam-folding part 210 to the out-coupling area 106. For example, a light beam introduced by the in-coupling area 102 is incident on the beam-folding part 210, and a portion of the light beam is folded to the beam-expanding part 110 along the opposite direction of the direction Y and a portion of the light beam keeps being guided along the opposite direction of the direction X. When the light beam folded by the beam-folding part 210 is incident on the beam-expanding part 110, the beam-expanding part 110 further expands the light beam along the opposite direction of the direction X to the out-coupling area 106. Therefore, the light beam introduced by the in-coupling area 102 is folded for changing propagation direction and is expanded along the predetermined direction. In this way, the area of beam-folding part 210 may be reduced while a larger eye box with better brightness uniformity is kept. Alternatively, the beam-expanding area 108 may be arranged between the in-coupling area 102 and the beam-folding area 208. Please refer to FIG. 21. FIG. 21 is a diagram of a waveguide combiner 300 having a different arrangement according to a third embodiment of the present invention. As shown in FIG. 21, the waveguide body 104 may have the beam-expanding part 110 to be arranged between the in-coupling area 102 and the beam-folding part 210. The beam-expanding part 210 is configured to expand the light beam introduced by the in-coupling area 102 to the beam-folding part 110. The beam-folding part 110 is arranged beside the beam-expanding part 210, and the beam-folding part 110 is configured to fold the light beam from the beam-expanding part 210 to the out-coupling area 106.

The waveguide combiner with a light beam processing area that is proposed by the present invention may guide the light beam for two-dimensional exit-pupil expansion (2D-EPE). The guided light beam can be efficiently expanded and/or folded through the beam-expanding part and the beam-folding part in one piece of waveguide without color dispersion, such that the size of the in-coupling area (or a light beam projector) can be reduced and the arrangement of locations of the in-coupling area and the out-coupling area can be more flexible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A waveguide combiner, comprising:
an in-coupling area, configured to introduce a light beam;
a waveguide body, configured to guide the light beam introduced by the in-coupling area; and
an out-coupling area, configured to output the light beam guided by the waveguide body;
wherein the waveguide body comprises a beam-folding area and a substrate part, the beam-folding area comprises a plurality of first beam-folding structures formed on one surface of the substrate part, and the plurality of first beam-folding structures comprise stripe structures each with a right triangle cross-section, and are parallel to each other and arranged along a predetermined direction;
wherein a refractive index of said each of the stripe structures is greater than a refractive index of the substrate part;
wherein the substrate part comprises a first layer on which the stripe structures are formed and further comprises a second layer on which the first layer is disposed, the refractive index of the stripe structure is greater than a refractive index of the first layer, and the refractive index of the first layer is greater than a refractive index of the second layer.

2. The waveguide combiner of claim 1, wherein at least a partial area of the beam-folding area is coated with reflective coating.

3. The waveguide combiner of claim 1, wherein each of the stripe structures comprises:
a first surface, for allowing the light beam introduced by the in-coupling area to be reflected; and
a second surface, for allowing the light beam reflected by the first surface to be further reflected by the second surface, wherein the second surface is perpendicular to the first surface, and a slope of the second surface is smaller than a slope of the first surface.

4. The waveguide combiner of claim 1, wherein the waveguide body further comprises a plurality of second beam-folding structures formed on another surface of the substrate part, said one surface and said another surface are opposite surfaces of the substrate part, the plurality of second beam-folding structures comprise stripe structures each with a right triangle cross-section, and are parallel to each other and arranged along the predetermined direction, and a shape of the right triangle cross-section of each stripe structure on said one surface and a shape of the right triangle cross-section of each stripe structure on said another surface have reflection symmetry.

5. The waveguide combiner of claim 3, wherein the waveguide body further comprises a plurality of second beam-folding structures formed on another surface of the substrate part, said one surface and said another surface are opposite surfaces of the substrate part, the plurality of second beam-folding structures comprise stripe structures each with a right triangle cross-section, and are parallel to each other and arranged along the predetermined direction, and a shape of the right triangle cross-section of each stripe structure on said one surface and a shape of the right triangle cross-section of each stripe structure on said another surface have rotational symmetry.

6. The waveguide combiner of claim 3, wherein the waveguide body further comprises a plurality of second beam-folding structures formed on said one surface of the substrate part, the plurality of second beam-folding structures comprise stripe structures each with a right triangle cross-section, and are parallel to each other and arranged along the predetermined direction, and a shape of the right triangle cross-section of each first beam-folding structure and a shape of the right triangle cross-section of each second beam-folding structure have reflection symmetry.

* * * * *